(12) United States Patent
Kudo

(10) Patent No.: US 10,382,800 B2
(45) Date of Patent: Aug. 13, 2019

(54) VIDEO SURVEILLANCE SYSTEM AND VIDEO SURVEILLANCE METHOD

(71) Applicant: HITACHI KOKUSAI ELECTRIC INC., Minato-ku, Tokyo (JP)

(72) Inventor: Tadamichi Kudo, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 81 days.

(21) Appl. No.: 15/556,318

(22) PCT Filed: Mar. 14, 2016

(86) PCT No.: PCT/JP2016/057972
§ 371 (c)(1),
(2) Date: Sep. 7, 2017

(87) PCT Pub. No.: WO2016/174946
PCT Pub. Date: Nov. 3, 2016

(65) Prior Publication Data
US 2018/0077433 A1    Mar. 15, 2018

(30) Foreign Application Priority Data

Apr. 28, 2015 (JP) .................................. 2015-091584

(51) Int. Cl.
*H04N 21/2343* (2011.01)
*H04N 7/18* (2006.01)
(Continued)

(52) U.S. Cl.
CPC ..... *H04N 21/2343* (2013.01); *H04N 5/23293* (2013.01); *H04N 5/265* (2013.01);
(Continued)

(58) Field of Classification Search
CPC .......................... H04N 21/2323; H04N 19/40
See application file for complete search history.

(56) References Cited

U.S. PATENT DOCUMENTS 7,418,007 B1 * 8/2008 Liu .................. H04N 21/23655
348/385.1

FOREIGN PATENT DOCUMENTS

JP    2004-153334 A    5/2004
JP    2004-363875 A    12/2004
(Continued)

OTHER PUBLICATIONS

International Search Report and English language translation dated Jun. 7, 2016.

*Primary Examiner* — Girumsew Wendmagegn
(74) *Attorney, Agent, or Firm* — Bacon & Thomas, PLLC

(57) ABSTRACT

A video surveillance system includes surveillance cameras; a video converting and combining unit; an encoder for encoding a combined video from the video converting and combining unit; a decoder for decoding the combined video transmitted from the encoder; a video converting and splitting unit for splitting the combined video decoded by the decoder into the videos captured by the surveillance cameras; and a display device for displaying the videos inputted from the video converting and splitting unit. When combining the videos into one combined video, the video converting and combining unit appends assignment information in which each of the surveillance cameras, rotation information indicating application of a rotation process, and division information indicating whether the corresponding video is a left half video or a right half video are associated with one another. The video converting and splitting unit splits an HD video into SD videos based on the assignment information.

3 Claims, 16 Drawing Sheets

(51) Int. Cl.
- *H04N 21/235* (2011.01)
- *H04N 19/40* (2014.01)
- *H04N 5/232* (2006.01)
- *H04N 5/262* (2006.01)
- *H04N 5/265* (2006.01)
- *H04N 21/643* (2011.01)
- *H04N 21/236* (2011.01)
- *H04N 21/2365* (2011.01)
- *H04N 21/434* (2011.01)
- *H04N 21/435* (2011.01)
- *H04N 21/4402* (2011.01)
- *G08B 25/00* (2006.01)

(52) U.S. Cl.
CPC .............. *H04N 5/2628* (2013.01); *H04N 7/18* (2013.01); *H04N 7/181* (2013.01); *H04N 19/40* (2014.11); *H04N 21/235* (2013.01); *H04N 21/2365* (2013.01); *H04N 21/23602* (2013.01); *H04N 21/234309* (2013.01); *H04N 21/435* (2013.01); *H04N 21/4342* (2013.01); *H04N 21/4347* (2013.01); *H04N 21/440218* (2013.01); *H04N 21/64322* (2013.01); *G08B 25/00* (2013.01)

(56) References Cited

FOREIGN PATENT DOCUMENTS

| | | |
|---|---|---|
| JP | 2005-051517 A | 2/2005 |
| JP | 2005-167486 A | 6/2005 |
| JP | 2007-174098 A | 7/2007 |
| JP | 2007-208796 A | 8/2007 |

\* cited by examiner

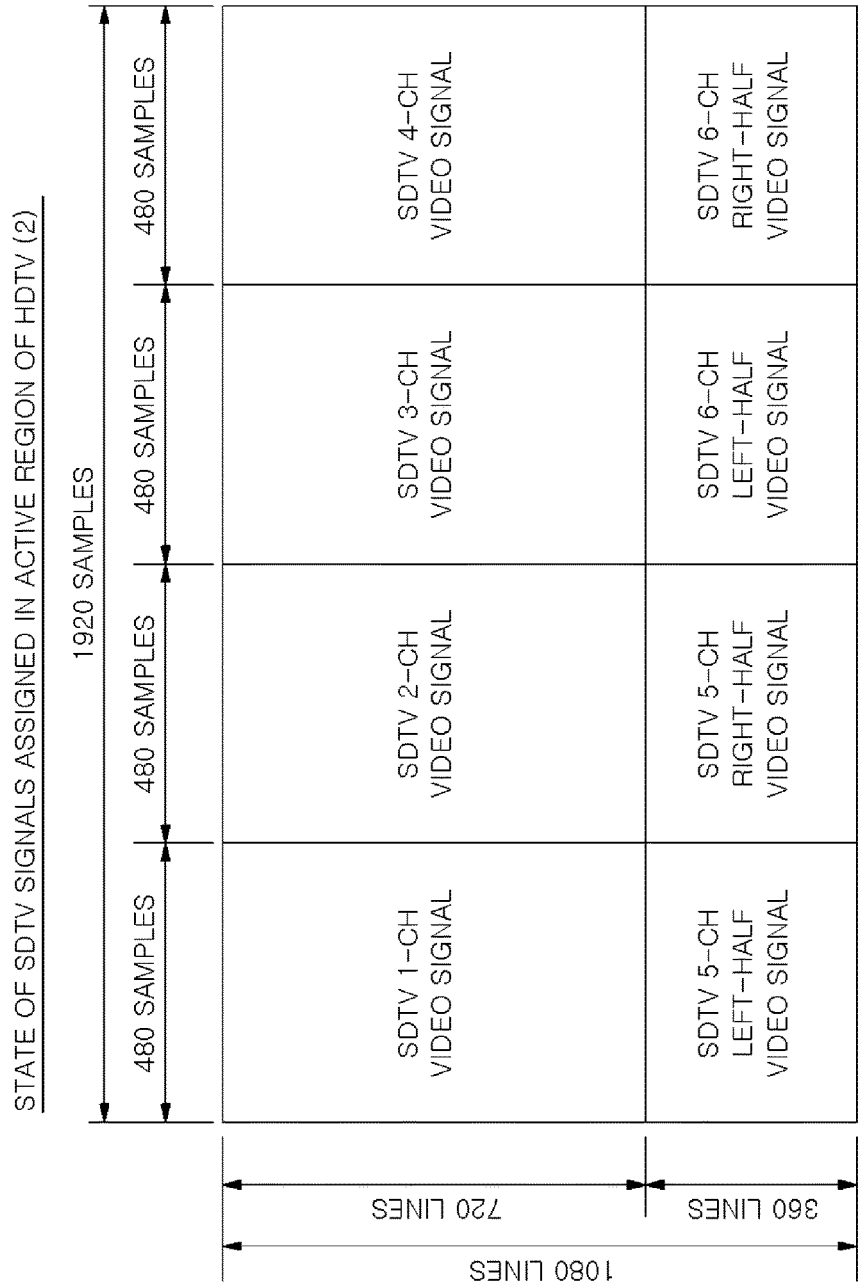

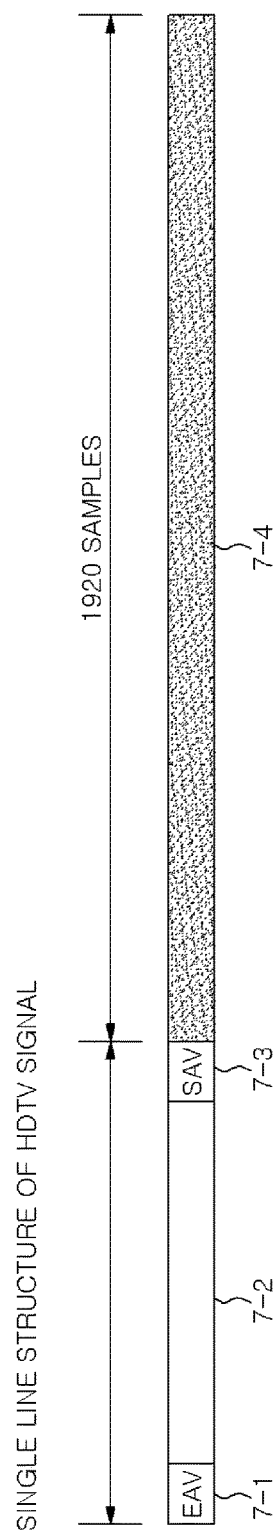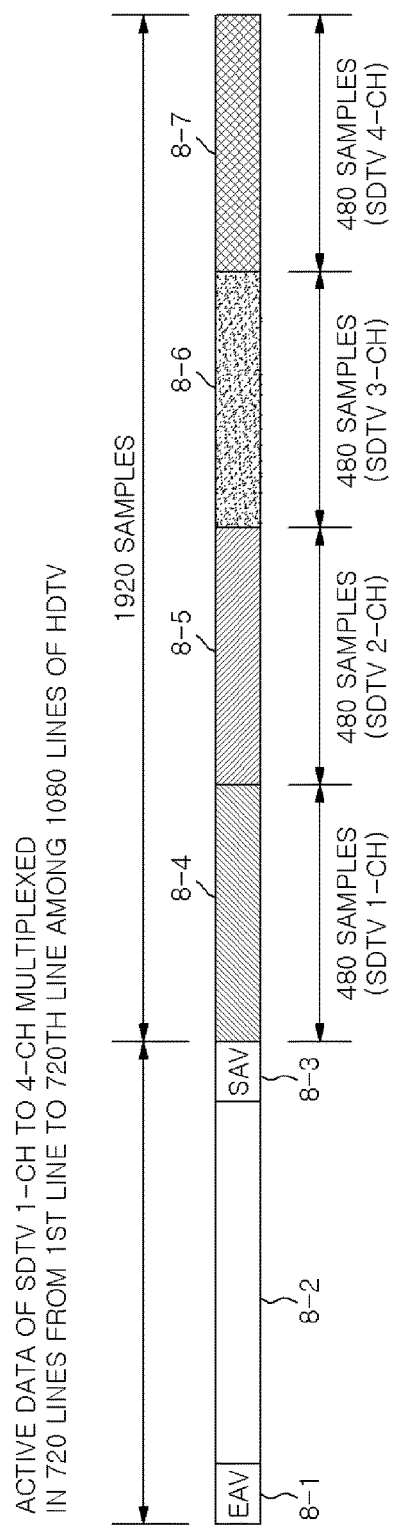

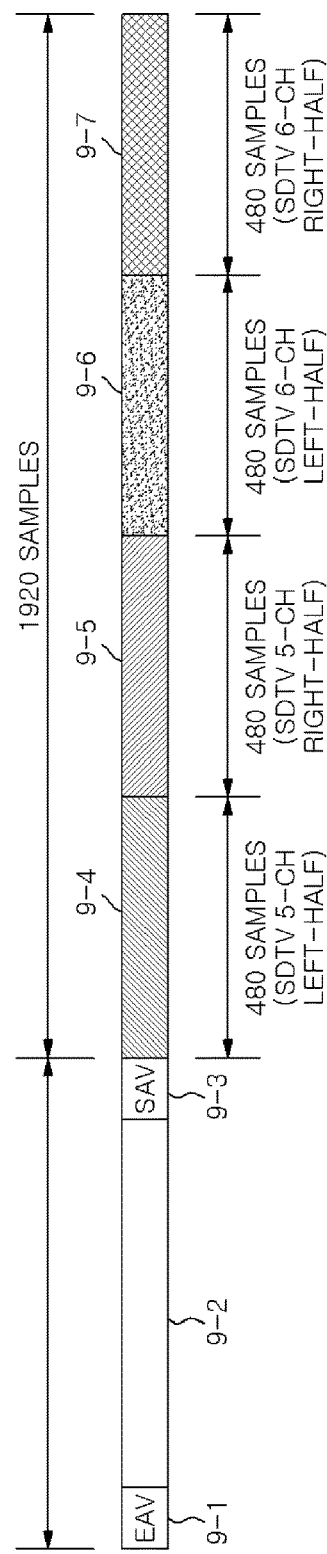

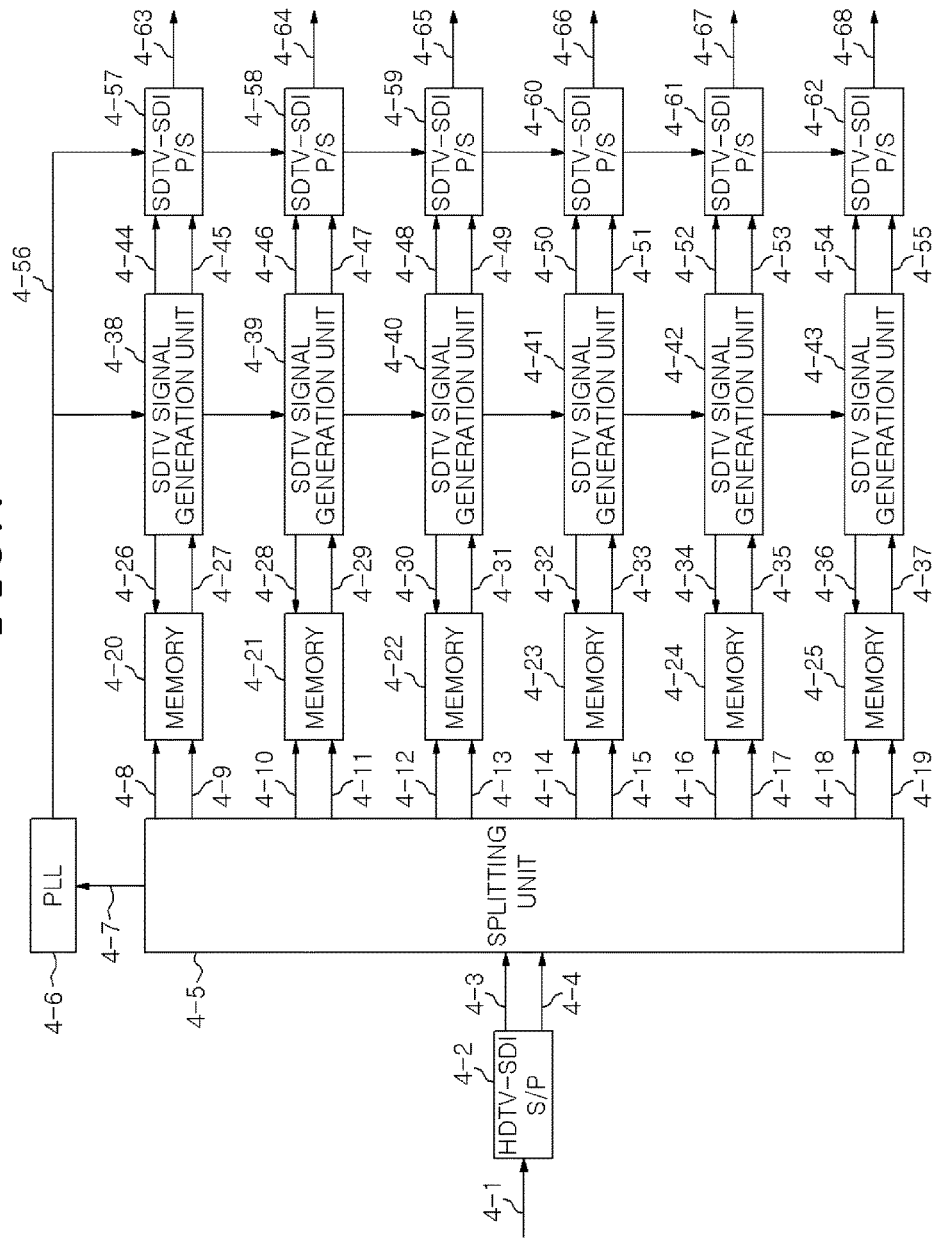

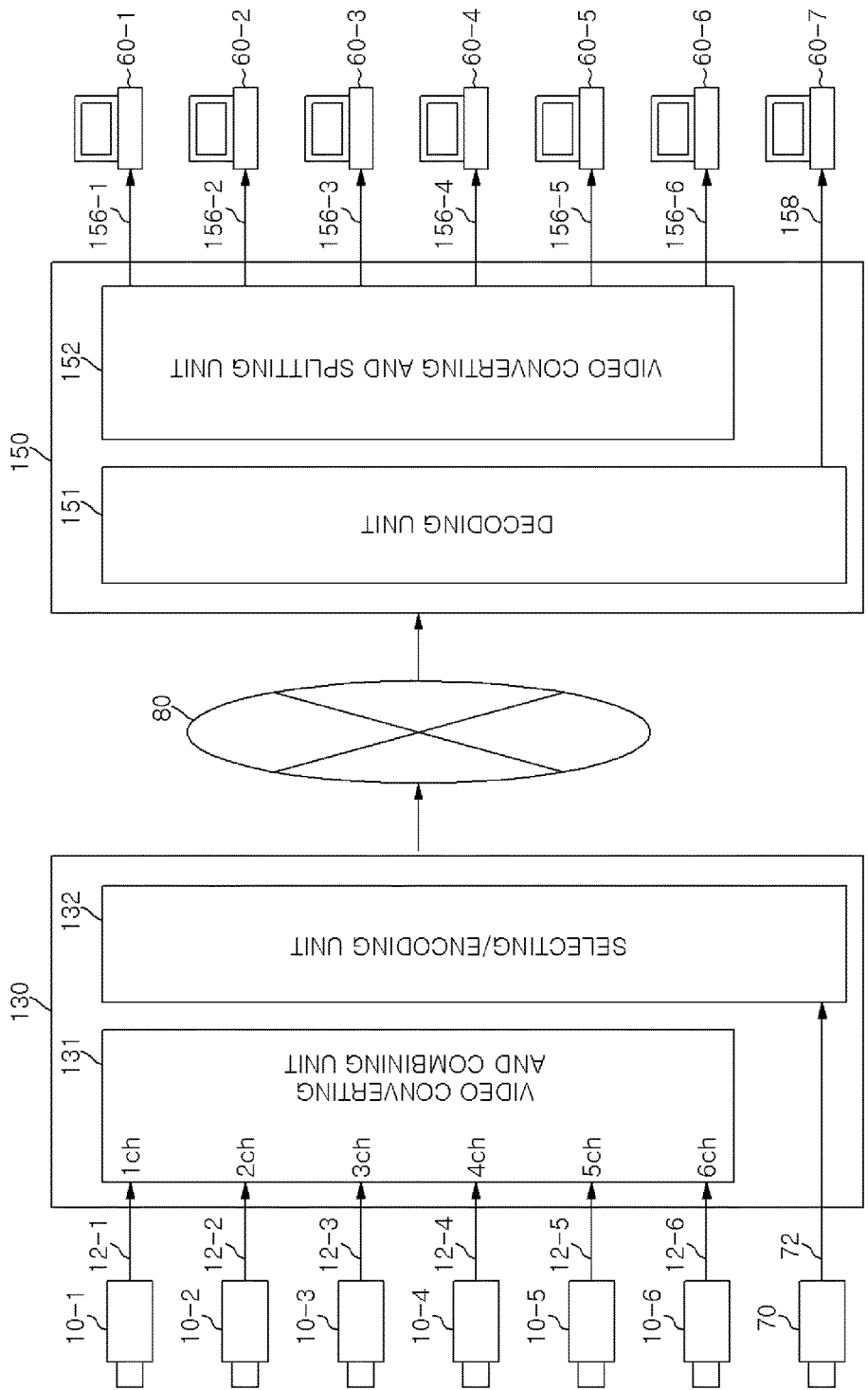

VIDEO SURVEILLANCE SYSTEM AND VIDEO SURVEILLANCE METHOD

FIELD OF THE INVENTION

The present invention relates to a video surveillance system and method which transmits a video captured by an image pickup device such as a surveillance camera or the like through a transmission line such as an IP (Internet Protocol) network or the like to display the video.

BACKGROUND OF THE INVENTION

Conventionally, there is known a CCTV (Closed Circuit Tele-Vision) system in which a video captured by a surveillance camera is encoded by an encoder and transmitted through a transmission line such as an IP network or the like. In a video surveillance system such as the CCTV system, in order to make it possible to check a status of a disaster in detail from an image (video) of a disaster area at the time of monitoring a crisis and a disaster, it is recently general to encode a video captured by an HD (High Definition) compliant surveillance camera by a HD compliant encoder and transmit the HD video through a transmission line.

However, an SD video captured by a conventional SD (Standard Definition) compliant analog camera is still widely used.

Patent Document 1 discloses a video transmission system capable of making the quantity of video data for a transmission line proper and suppressing delays and missing parts of video images effectively. Further, Patent Document 1 discloses a technique for compressing and encoding videos inputted from a plurality of surveillance cameras connected to Web encoders and transmitting the video data while maintaining a desired quality.

Patent Document 1: Japanese Patent Application Publication No. 2005-051517

In a conventional video surveillance system including the system disclosed in Patent Document 1, it is general to provide integrated LAN switches and encoders as many as the number of the surveillance cameras in order to transmit videos captured by the surveillance cameras through an IP network. When the number of the surveillance cameras is increased, the number of the encoders is also increased. Therefore, a transmission band, an installation location, a cost and the like may be restricted.

In the case of replacing a conventional video surveillance system for transmitting an SD video captured by an SD compliant analog camera with an HD compliant video surveillance system, there are required an HD compliant surveillance camera, an HD compliant encoder and an HD compliant decoder. Accordingly, an equipment investment cost is increased.

SUMMARY OF THE INVENTION

In view of the above, the present invention provides a video surveillance system and a video surveillance method capable of realizing transmission of a video captured by an SD or an HD compliant camera by an inexpensive system configuration.

In accordance with an aspect of the present invention, there is provided a video surveillance system including: a plurality of surveillance cameras; a video converting and combining unit configured to combine a plurality of videos captured by the respective surveillance cameras into one combined video; an encoder configured to encode the combined video combined by the video converting and combining unit; a decoder configured to decode the combined video transmitted from the encoder through a transmission line; a video converting and splitting unit configured to split the combined video decoded by the decoder into the videos captured by the respective surveillance cameras; and a display device configured to display on a display screen the videos captured by the respective surveillance cameras inputted from the video converting and splitting unit, wherein when combining the videos captured by the plurality of surveillance cameras into one combined video, the video converting and combining unit appends assignment information in which each of the surveillance cameras that captured the plurality of videos, rotation information indicating application of a rotation process, and division information indicating whether the corresponding video is a left half video or a right half video are associated with one another, and wherein the video converting and splitting unit splits the combined video into a plurality of videos based on the assignment information.

Further, in the video surveillance system, the surveillance cameras may be SD (Standard Definition) compliant cameras, the video converting and combining unit may combine five or six SD videos captured by the respective surveillance cameras into one HD (High Definition) video, and the video converting and splitting unit may split the HD video decoded by the decoder into five or six SD videos.

In accordance with another aspect of the present invention, there is provided a video surveillance method including the steps of: capturing SD videos by a plurality of surveillance cameras; combining the SD videos into one HD video by a video converting and combining unit; encoding the HD video by an encoder; decoding the HD video transmitted from the encoder through a transmission line by a decoder; splitting the HD video decoded by the decoder into the SD videos by a video converting and splitting unit; and displaying the SD videos inputted from the video converting and splitting unit on a display screen by a display device, wherein the step of combining the SD videos into one HD video, including the step of: appending assignment information in which each of the surveillance cameras capturing the SD videos, rotation information indicating application of a rotation process and division information indicating whether the corresponding video is a left half video or a right half video are associated with one another, and wherein the step of splitting the HD video decoded by the decoder into the SD videos, including the step of: splitting the HD video decoded by the decoder into the SD videos based on the assignment information.

In accordance with the present invention, it is possible to realize the transmission of the video captured by the SD or the HD compliant camera by the inexpensive system configuration.

BRIEF DESCRIPTION OF THE DRAWINGS

FIG. 5 schematically shows a second example in the case of assigning the video signal of the SDTV to the active region of the HDTV.

FIGS. 6A to 6C show a single line structure of an HDTV signal and a single line structure obtained in the case of multiplexing active video information of SDTV signals of six channels in an active video information region of the HDTV signal.

FIG. 7 is a block diagram showing an example of a video converting and splitting unit shown in FIG. 1.

FIG. 8 is a block diagram showing an example of a configuration of a video surveillance system according to a second embodiment.

DETAILED DESCRIPTION OF THE EMBODIMENTS

First Embodiment

Hereinafter, a video surveillance system according to a first embodiment will be described.

In the video surveillance system according to the first embodiment, six SD videos captured by six SD (Standard Definition) compliant surveillance cameras are combined into one HD (High Definition) video, compressed by an HDTV encoder, and transmitted through a transmission line. Then, the transmitted HD video is decoded by an HD decoder, split to six SD videos and displayed on display devices. Therefore, the number of transmission bands, encoders and decoders can be reduced.

(Configuration of Video Surveillance System)

Figure 1:
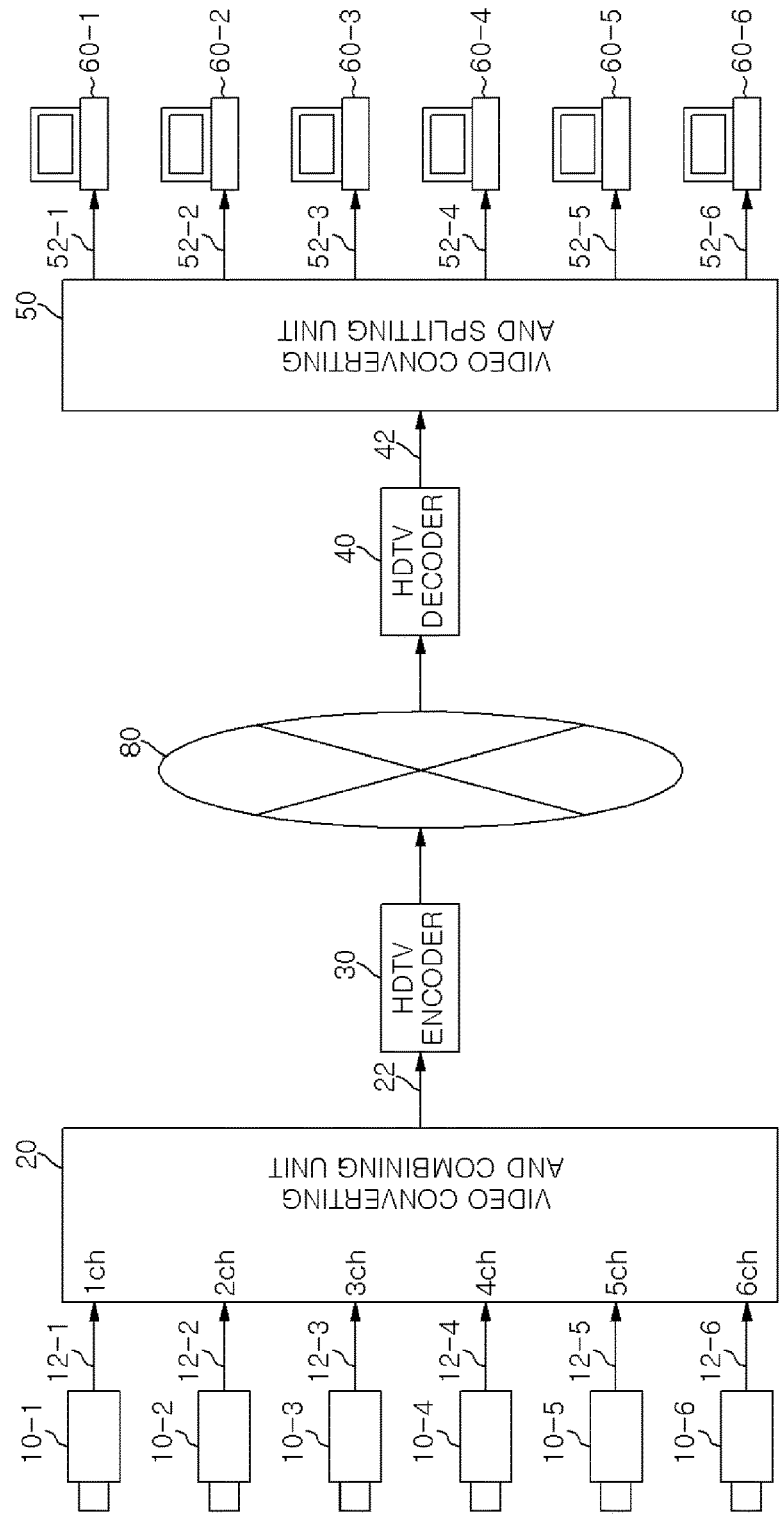
FIG. 1 is a block diagram showing an example of a configuration of a video surveillance system according to a first embodiment.

Next, a configuration of the video surveillance system according to the first embodiment will be described with reference to FIG. 1. FIG. 1 is a block diagram showing an example of the configuration of the video surveillance system according to the first embodiment.

The video surveillance system according to the first embodiment will be described with reference to FIG. 1. At a transmission side, an HDTV signal obtained by multiplexing SDTV signals of six channels is transmitted through an HD-SDI. At a reception side, the SDTV signals of six channels which are multiplexed to the HDTV signal are extracted, separated and reproduced.

The video surveillance system shown in FIG. 1 includes SDTV cameras 10-1 to 10-6, SD-SDIs 12-1 to 12-6, a video converting and combining unit 20, an HD-SDI 22, an HDTV encoder 30, a transmission line 80, an HDTV decoder 40, an HD-SDI 42, a video converting and splitting unit 50, SD-SDIs 52-1 to 52-6, and display devices 60-1 to 60-6.

Hereinafter, operations of the above components will be described.

The SDTV camera 10-1 outputs a captured video, i.e., a so-called SDTV signal, to the video converting and combining unit 20 through the SD-SDI 12-1. The SDTV camera 10-2 outputs a captured video, i.e., a so-called SDTV signal, to the video converting and combining unit 20 through the SD-SDI 12-2. The SDTV camera 10-3 outputs a captured video, i.e., a so-called SDTV signal, to the video converting and combining unit 20 through the SD-SDI 12-3. The SDTV camera 10-4 outputs a captured video, i.e., a so-called SDTV signal, to the video converting and combining unit 20 through the SD-SDI 12-4. The SDTV camera 10-5 outputs a captured video, i.e., a so-called SDTV signal to the video converting and combining unit 20 through the SD-SDI 12-5. The SDTV camera 10-6 outputs a captured video, i.e., a so-called SDTV signal to the video converting and combining unit 20 through the SD-SDI 12-6.

The video converting and combining unit 20 multiplexes the SDTV signals received through the SD-SDIs 12-1 to 12-6 in an active video information region of an HDTV signal to be generated and outputs the HDTV signal to the HDTV encoder 30 through the HD-SDI 22.

The HDTV encoder 30 performs image compression of the HDTV signal received through the HD-SDI 22 and outputs the compressed information to the transmission line 80 such as an IP (Internet Protocol) network or the like.

The HDTV decoder 40 reproduces the HDTV signal by expanding the compressed information obtained from the transmission line and outputs the HDTV signal to the video converting and splitting unit 50 through the HD-SDI 42.

The video converting and splitting unit 50 extracts and splits the SDTV signals of six channels which are multiplexed in the active video information region of the HDTV signal received through the HD-SDI 42 and outputs the respective SDTV signals through the SD-SDIs 52-1 to 52-6.

The display device 60-1 outputs and displays the SDTV signal received through the SD-SDI 52-1 on a monitor. The display device 60-2 outputs and displays the SDTV signal received through the SD-SDI 52-2 on the monitor. The display device 60-3 outputs and displays the SDTV signal received through the SD-SDI 52-3 on the monitor. The display device 60-4 outputs and displays the SDTV signal received through the SD-SDI 52-4 on the monitor. The display device 60-5 outputs and displays the SDTV signal received through the SD-SDI 52-5 on the monitor. The display device 60-6 outputs and displays the SDTV signal received through the SD-SDI 52-6 on the monitor.

Figure 2:
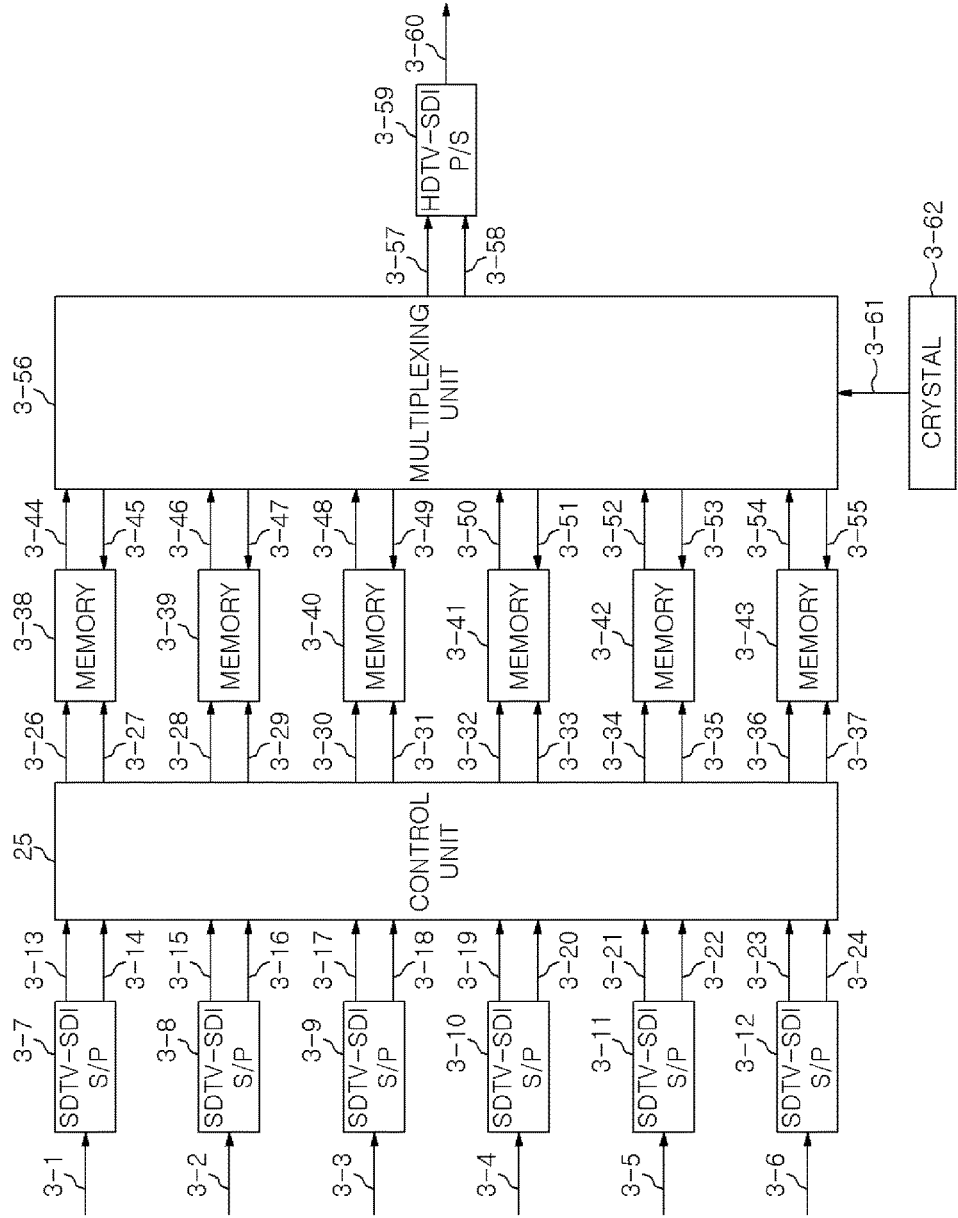
FIG. 2 is a block diagram showing an example of a configuration of a video converting and combining unit shown in FIG. 1.

Next, the video converting and combining unit shown in FIG. 1 will be described in detail with reference to FIG. 2. FIG. 2 is a block diagram showing an example of a configuration of the video converting and combining unit shown in FIG. 1.

As shown in FIG. 2, the video converting and combining unit 20 includes: SD-SDIs 3-1 to 3-6; SD-SDI-S/Ps 3-7 to 3-12; SDTV signals 3-13, 3-15, 3-17, 3-19, 3-21 and 3-23; clocks 3-14, 3-16, 3-18, 3-20, 3-22 and 3-24; a control unit 3-25; SDTV signals 3-26, 3-28, 3-30, 3-32, 3-34 and 3-36; recording signals 3-27, 3-29, 3-31, 3-33, 3-35 and 3-37; memories 3-38 to 3-43; SDTV active video informations 3-44, 3-46, 3-48, 3-50, 3-52 and 3-54; readout signals 3-45, 3-47, 3-49, 3-51, 3-53 and 3-55; a multiplexing unit 3-56; an HDTV signal 3-57; a clock 3-58; an HD-SDI-P/S 3-59; an HD-SDI 3-60; a clock 3-61; and a crystal oscillator 3-62.

Hereinafter, operations of the above components will be described.

The SD-SDI-S/P 3-7 converts the SDTV signal received through the SD-SDI 3-1 from a serial signal to a parallel signal and outputs the SDTV signal 3-13 and the clock 3-14 to the control unit 3-25. The SD-SDI-S/P 3-8 converts the SDTV signal received through the SD-SDI 3-2 from a serial signal to a parallel signal and outputs the SDTV signal 3-15 and the clock 3-16 to the control unit 3-25. The SD-SDI-S/P 3-9 converts the SDTV signal received through the SD-SDI 3-3 from a serial signal to a parallel signal and outputs the SDTV signal 3-17 and the clock 3-18 to the control unit 3-25. The SD-SDI-S/P 3-10 converts the SDTV signal received through the SD-SDI 3-4 from a serial signal to a parallel signal and outputs the SDTV signal 3-19 and the clock 3-20 to the control unit 3-25. The SD-SDI-S/P 3-11 converts the SDTV signal received through the SD-SDI 3-5 from a serial signal to a parallel signal and outputs the SDTV signal 3-21 and the clock 3-22 to the control unit 3-25. The SD-SDI-S/P 3-12 converts the SDTV signal received through the SD-SDI 3-6 from a serial signal to a parallel signal and outputs the SDTV signal 3-23 and the clock 3-24 to the control unit 3-25. The clocks 3-14, 3-16, 3-18, 3-20, 3-22 and 3-24 are 27 MHz reference clocks of the SDTV signals.

When receiving the SDTV signal 3-13 and the clock 3-14, the control unit 3-25 generates the recording signal 3-27 for recording the SDTV active video information of the SDTV signal 3-13 in the memory 3-38 and outputs the recording signal 3-27 and the SDTV signal 3-26 to the memory 3-38. When receiving the SDTV signal 3-15 and the clock 3-16, the control unit 3-25 generates the recording signal 3-29 for recording the SDTV active video information of the SDTV signal 3-15 in the memory 3-39 and outputs the recording signal 3-29 and the SDTV signal 3-28 to the memory 3-39. When receiving the SDTV signal 3-17 and the clock 3-18, the control unit 3-25 generates the recording signal 3-31 for recording the SDTV active video information of the SDTV signal 3-17 in the memory 3-40 and outputs the recording signal 3-31 and the SDTV signal 3-30 to the memory 3-40. When receiving the SDTV signal 3-19 and the clock 3-20, the control unit 3-25 generates the recording signal 3-33 for recording the SDTV active video information of the SDTV signal 3-19 in the memory 3-41 and outputs the recording signal 3-33 and the SDTV signal 3-32 to the memory 3-41. When receiving the SDTV signal 3-21 and the clock 3-22, the control unit 3-25 generates the recording signal 3-35 for recording the SDTV active video information of the SDTV signal 3-21 in the memory 3-42 and outputs the recording signal 3-35 and the SDTV signal 3-34 to the memory 3-42. When receiving the SDTV signal 3-23 and the clock 3-24, the control unit 3-25 generates the recording signal 3-37 for recording the SDTV active video information of the SDTV signal 3-23 in the memory 3-43 and outputs the recording signal 3-37 and the SDTV signal 3-36 to the memory 3-43.

The multiplexing unit 3-56 generates the readout signals 3-45, 3-47, 3-49, 3-51, 3-53 and 3-55 from the reference clock 3-61 of the HDTV signal of the crystal oscillator 3-62, outputs the readout signal to the memories 3-38 to 3-43, and multiplexes the active video informations 3-44, 3-46, 3-48, 3-50, 3-52 and 3-54 of the readout SDTV signals in an active video information region of an HDTV signal to be generated. The generated HDTV signal 3-57 and the clock 3-58 are outputted to the HD-SDI-P/S 3-59.

When receiving HDTV signal 3-57 and the clock 3-58, the HD-SDI-P/S 3-59 converts the HDTV signal 3-57 from a parallel signal to a serial signal and outputs the HDTV signal to the HD-SDI 3-60.

Figure 3:
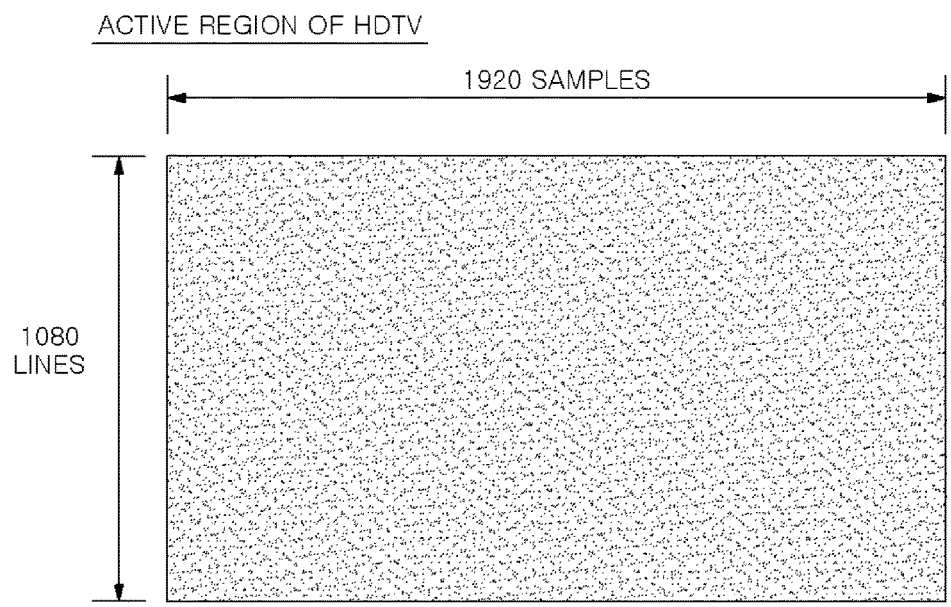
FIG. 3 schematically shows an active region of an HDTV.
Figure 4:
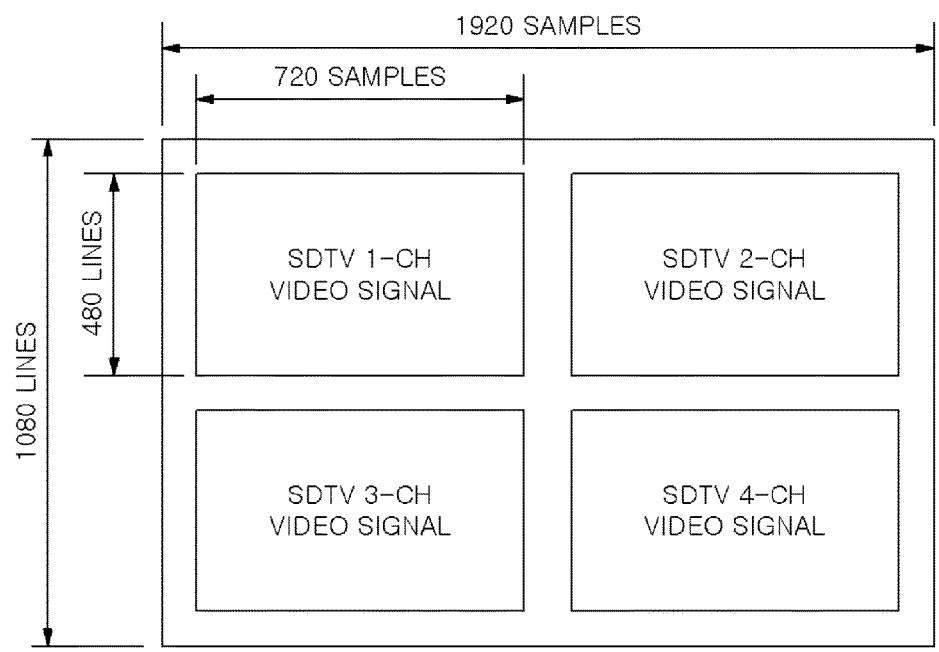
FIG. 4 schematically shows a first example in the case of assigning a video signal of an SDTV to the active region of the HDTV.

Hereinafter, a specific operation performed in the multiplexing unit 3-56 will be described with reference to FIGS. 3 to 5. FIG. 3 schematically shows an active region of the HDTV. FIG. 4 schematically shows an example (1) in the case of assigning a video signal of the SDTV to the active region of the HDTV. FIG. 5 shows an example (2) in the case of assigning a video signal of the SDTV to the active region of the HDTV.

As shown in FIG. 3, the display region (active region) of the HD video is 1920×1080 which is six times greater than 720×480 of the display region of the SD video. However, as shown in FIG. 4, four display regions, each having a dimension of 720×480, of the SD video are arranged in the display region of the HD video as in the conventional case.

On the other hand, in the present embodiment, as shown in FIG. 5, six original SD videos (1 ch to 6 ch) are arranged while being rotated by 90 degrees in a counterclockwise direction. SD videos of 1 ch to 4 ch are arranged in an upper part. SD videos of 5 ch and 6 ch, each being divided into the right half and the left half at horizontal 360 pixels, are arranged as shown in FIG. 5. In this way, the assignment of the video signals is completed.

With this combination, the six SD videos can be considered as one HD video and this HD video can be transmitted to one TV encoder. According to the standard specifications of Ministry of Land, Infrastructure, Transport and Tourism, the SD video is transmitted at 6 Mbps. Since, however, the HD video is transmitted at 12 Mbps, the transmission band can be reduced by ⅓ compared to the case of transmitting six SD videos to six SDTV encoders (36 Mbps). At this time, the rotation information indicating that a rotation process has been applied to each of the SD videos (1 ch to 6 ch) and the division information indicating whether each of the divided SD videos (5ch and 6ch) is the left half video or the right half video may be transmitted as assignment information. Accordingly, the HDTV decoder 40 that has received the HD video shown in FIG. 5 can perform a rotating and combining process based on the rotation information and the division information and split the HD video to the SD videos.

Any one of the rotation information and the division information may be used as the assignment information.

Next, an example of a method for regularly multiplexing the active video information of the SDTV signals in the active video information region of the HDTV signal will be described with reference to FIGS. 6A to 6C. FIGS. 6A to 6C show a single line structure of the HDTV signal and a single line structure obtained in the case of multiplexing the active video information of the SDTV signals of the six channels in the active video information region of the HDTV signal. The HDTV video display region is shown in FIG. 3, which is a general HDTV signal referred to as 1080i. This display size is 1920 samples×1080 lines.

FIG. 6A shows a single line structure of the HDTV signal which includes an EAV 7-1, a blanking region 7-2, an SAV 7-3, and an HDTV active video information region 7-4. The video information of the HDTV active video information region 7-4 is displayed on a monitor of the SDTV display device 60. FIGS. 6B and 6C show single line structures obtained in the case of multiplexing the active video information of the SDTV signals of six channels in the active video information region of the HDTV signal which include EAVs 8-1 and 9-1, blanking regions 8-2 and 9-2, SAVs 8-3 and 9-3, first channel SDTV active video information 8-4, second channel SDTV active video information 8-5, third channel SDTV active video information 8-6, fourth channel SDTV active video information 8-7, fifth channel left half SDTV active video information 9-4, fifth channel right half SDTV active video information 9-5, sixth channel left half SDTV active video information 9-6, and sixth channel right half SDTV active video information 9-7.

Hereinafter, FIGS. 6A to 6C will be described in detail.

As shown in FIG. 6A, in the single line structure of the HDTV signal, the HDTV active video information region 7-4 is displayed as the active video of the HDTV signal. Therefore, as shown in FIG. 6B, the HDTV active video information region is multiplexed such that 480 samples are assigned to each of the 1-ch SDTV active video information 8-4, the 2-ch SDTV active video information 8-5, the 3-ch SDTV active video information 8-6 and the 4-ch SDTV active video information 8-7. This is applied to 720 lines (so-called SDTV signal) from the first line to the $720^{th}$ line among 1080 lines of the HDTV signal in a state where the SDTV signal is rotated by 90 degrees in the counterclockwise direction.

As shown in FIG. 6C, the HDTV active video region is multiplexed such that 480 samples are assigned to each of the 5-ch left half SDTV active video information 9-4, the 5-ch right half SDTV active video information 9-5, the 6-ch left half SDTV active video information 9-6 and the 6-ch right half SDTV active video information 9-7. This is applied to 360 lines (so-called SDTV signal) from the 721th line to the $1080^{th}$ line among 1080 lines of the HDTV signal, half by half, in a state where the SDTV signal is rotated by 90 degrees in the counterclockwise direction. In the video converting and splitting unit 50 to be described later, the HDTV signal assigned as shown in FIG. 5 is split, combined, rotated by 90 degrees in a clockwise direction and restored to the original state. Accordingly, the SD videos are displayed on the monitors of the display devices.

Hereinafter, the video converting and splitting unit shown in FIG. 1 will be described in detail with reference to FIG. 7. FIG. 7 is a block diagram showing an example of a configuration of the video converting and splitting unit shown in FIG. 1.

As shown in FIG. 7, the video converting and splitting unit 50 includes: an HD-SDI 4-1; an HD-SDI-S/P 4-2; an HDTV signal 4-3; a clock 4-4; a splitting unit 4-5; a PLL control unit 4-6; a clock 4-7; SDTV active video informations 4-8, 4-10, 4-12, 4-14, 4-16 and 4-18; recording signals 4-9, 4-11, 4-13, 4-15, 4-17 and 4-19; memories 4-20 to 4-25; readout signals 4-26, 4-28, 4-30, 4-32, 4-34 and 4-36; SDTV active video informations 4-27, 4-29, 4-31, 4-33, 4-35 and 4-37; SDTV signal generation units 4-38 to 4-43; SDTV signals 4-44, 4-46, 4-48, 4-50, 4-52 and 4-54; clocks 4-45, 4-47, 4-49, 4-51, 4-53, 4-55; a clock 4-56; SD-SDI-P/Ss 4-57 to 4-62; and SD-SDIs 4-63 to 4-68.

Hereinafter, operations of the above components will be described. The HD-SDI-S/P 4-2 converts the HDTV signal received through the HD-SDI 4-1 from a serial signal to a parallel signal, generates the HDTV signal 4-3, and outputs the generated HDTV signal 4-3 together with clock 4-4 to the splitting unit 4-5.

When receiving the HDTV signal 4-3 and the clock 4-4, the splitting unit 4-5 extracts and splits the SDTV signals of six channels which are multiplexed in the active video information region of the HDTV signal 4-3. The splitting unit 4-5 extracts the 1-ch SDTV signal, generates the recording signal 4-9, and stores the SDTV signal 4-8 in the memory 4-20. The splitting unit 4-5 extracts the 2-ch SDTV signal, generates the recording signal 4-11, and stores the SDTV signal 4-10 in the memory 4-21. The splitting unit 4-5 extracts the 3-ch SDTV signal, generates the recording signal 4-13, and stores the SDTV signal 4-12 in the memory 4-22. The splitting unit 4-5 extracts the 4-ch SDTV signal, generates the recording signal 4-15, and stores the SDTV signal 4-14 in the memory 4-23. The splitting unit 4-5 extracts the 5-ch SDTV signal, generates the recording signal 4-17, and stores the SDTV signal 4-16 in the memory 4-24. The splitting unit 4-5 extracts the 6-ch SDTV signal, generates the recording signal 4-19, and stores the SDTV signal 4-18 in the memory 4-25. The recording signals 4-9, 4-11, 4-13, 4-15, 4-17 and 4-19 are reference clock systems of the HDTV signal and, e.g., 74 MHz.

The PLL control unit 4-6 generates a clock 4-56 as a reference of the SDTV signal synchronized with the clock 4-7 as a reference of the HDTV signal.

The SDTV signal generation unit 4-38 generates the recording signal 4-26, reads out the SDTV active video information 4-27, generates the SDTV signal based on the clock 4-56, and outputs the SDTV signal 4-44 and the clock 4-45 to the SD-SDI-P/S 4-57. The SDTV signal generation unit 4-39 generates the recording signal 4-28, reads out the SDTV active video information 4-29, generates the SDTV signal based on the clock 4-56, and outputs the SDTV signal 4-46 and the clock 4-47 to the SD-SDI-P/S 4-58. The SDTV signal generation unit 4-40 generates the recording signal 4-30, reads out the SDTV active video information 4-31, generates the SDTV signal based on the clock 4-56, and outputs the SDTV signal 4-48 and the clock 4-49 to the SD-SDI-P/S 4-59. The SDTV signal generation unit 4-41 generates the recording signal 4-32, reads out the SDTV active video information 4-33, generates the SDTV signal based on the clock 4-56, and outputs the SDTV signal 4-50 and the clock 4-51 to the SD-SDI-P/S 4-60. The SDTV signal generation unit 4-42 generates the recording signal 4-34, reads out the SDTV active video information 4-35, generates the SDTV signal based on the clock 4-56, and outputs the SDTV signal 4-52 and the clock 4-61 to the SD-SDI-P/S 4-61. The SDTV signal generation unit 4-43 generates the recording signal 4-36, reads out the SDTV active video information 4-37, generates the SDTV signal based on the clock 4-56, and outputs the SDTV signal 4-54 and the clock 4-55 to the SD-SDI-P/S 4-62. The readout signals 4-26, 4-28, 4-30, 4-32, 4-34 and 4-36 are reference clock systems of the SDTV signal and, e.g., 27 MHz.

The SD-SDI-P/S 4-57 converts the SDTV signal 4-44 inputted from the SDTV signal generation unit 4-38 from a parallel signal to a serial signal and outputs the SDTV signal to the SD-SDI 4-63. The SD-SDI-P/S 4-58 converts the SDTV signal 4-46 inputted from the SDTV signal generation unit 4-39 from a parallel signal to a serial signal and outputs the SDTV signal to the SD-SDI 4-64. The SD-SDI-P/S 4-59 converts the SDTV signal 4-48 inputted from the SDTV signal generation unit 4-40 from a parallel signal to a serial signal and outputs the SDTV signal to the SD-SDI 4-65. The SD-SDI-P/S 4-60 converts the SDTV signal 4-50 inputted from the SDTV signal generation unit 4-41 from a parallel signal to a serial signal and outputs the SDTV signal to the SD-SDI 4-66. The SD-SDI-P/S 4-61 converts the SDTV signal 4-52 inputted from the SDTV signal generation unit 4-42 from a parallel signal to a serial signal and outputs the SDTV signal to the SD-SDI 4-67. The SD-SDI-P/S 4-62 converts the SDTV signal 4-54 inputted from the SDTV signal generation unit 4-43 from a parallel signal to a serial signal and outputs the SDTV signal to the SD-SDI 4-68.

Hereinafter, a specific operation performed in the video converting and splitting unit 50 will be described.

The video converting and splitting unit 50 restores the HDTV signal inputted from the HDTV decoder 40 through the HD-SDI-S/P 4-2 to the original SD video by cutting specific portions of the HDTV signal based on the assignment information of the SDTV signal which is shown in FIG. 5 and performing a process of rotating, combining and converting the HDTV signal to the SDTV signal. At this time, if the rotation information and the division information are received through the transmission line 80, the rotating and combining process may be performed based on the rotation information and the division information. Further, the rotating and combining process may be performed based on corresponding information assigned as shown in FIG. 5 which is held in advance together with the rotation information and the division information.

As described above, in accordance with the video surveillance system according to the first embodiment, the transmission of the video captured by the SD or the HD compliant camera can be realized by the inexpensive system configuration.

By transmitting the rotation information indicating that the rotation process is applied to each of the SD videos 1ch to 6ch and the division information indicating whether each of the divided SD videos (5 ch and 6 ch) is the right half video or the left half video as the assignment information, the HD video can be decoded to the original SD video by the decoder without previously holding the SD videos, the rotation information and the division information. Therefore, even if the arrangement of the SDTV cameras 10-1 to 10-6 is changed, the decoding can be performed by transmitting the rotation information and the division information after the change of the arrangement as the assignment information.

Second Embodiment

Hereinafter, a video surveillance system according to a second embodiment will be described.

The video surveillance system according to the second embodiment is different from the video surveillance system according to the first embodiment in that the HDTV encoder and the HDTV decoder has a function of converting and combining SD videos and a function of converting and splitting SD videos, respectively. Further, in this configuration, an HD compliant surveillance camera is added and an HD video of one system is inputted together with the six SD videos into the HDTV encoder. The HDTV decoder has the SD videos of six systems and the HD video of one system as an output.

(Configuration of Video Surveillance System)

Hereinafter, a configuration of the video surveillance system according to the second embodiment will be described with reference to FIG. 8. FIG. 8 is a block diagram showing an example of the configuration of the video surveillance system according to the second embodiment. Like reference numerals in FIGS. 1 and 8 denote like parts, and redundant description thereof will be omitted.

As shown in FIG. 8, in the video surveillance system according to the second embodiment, at a transmission side, an HDTV signal obtained by multiplexing SDTV signals of six channels is transmitted through HD-SDI. At a reception side, the SDTV signals of six channels which are multiplexed to the HDTV signal are extracted and separated and reproduced. The HDTV signal inputted from the HD compliant surveillance camera is also transmitted to the reception side and reproduced.

Referring to FIG. 8, the video surveillance system includes: SDTV cameras 10-1 to 10-6; SD-SDIs 12-1 to 12-6; an HDTV camera 70; an HD-SDI 72; an HDTV encoder 130 having a video converting and combining unit 131 and a selecting/encoding unit 132; a transmission line 80; an HDTV decoder 150 having a decoding unit 151 and a video converting and splitting unit 152; SD-SDIs 156-1 to 156-6; display devices 60-1 to 60-6; a display device 60-7; and an HD-SDI 158.

Hereinafter, operations of the above components will be described.

The SDTV camera 10-1 outputs a captured video, i.e., a so-called SDTV signal, to the video converting and combining unit 131 of the HDTV encoder 130 through the SD-SDI 12-1. The SDTV camera 10-2 outputs a captured video, i.e., a so-called SDTV signal, to the video converting and combining unit 131 of the HDTV encoder 130 through the SD-SDI 12-2. The SDTV camera 10-3 outputs a captured video, i.e., a so-called SDTV signal, to the video converting and combining unit 131 of the HDTV encoder 130 through the SD-SDI 12-3. The SDTV camera 10-4 outputs a captured video, i.e., a so-called SDTV signal, to the video converting and combining unit 131 of the HDTV encoder 130 through the SD-SDI 12-4. The SDTV camera 10-5 outputs a captured video, i.e., a so-called SDTV signal, to the video converting and combining unit 131 of the HDTV encoder 130 through the SD-SDI 12-5. The SDTV camera 10-5 outputs a captured video, i.e., a so-called SDTV signal, to the video converting and combining unit 131 of the HDTV encoder 130 through the SD-SDI 12-5.

The HDTV camera 70 outputs a captured video, i.e., a so-called HDTV signal, to the selecting/encoding unit 132 of the HDTV encoder 130 through the HD-SDI 72.

The video converting and combining unit 131 multiplexes the SDTV signals received through the SD-SDIs 12-1 to 12-6 in the active video information region of the HDTV signal to be generated and outputs the HDTV signal to the selecting/encoding unit 132 through a HD-SDI.

The selecting/encoding unit 132 of the HDTV encoder 130 performs image compression of the HDTV signal received from the video converting and combining unit 131 or the HDTV signal received from the HDTV camera 70 through the HD-SDI 72 and outputs the compressed information to the transmission line 80 such as the IP (Internet Protocol) network or the like.

The decoding unit of the HDTV decoder 150 reproduces the HDTV signal by expanding the compressed information obtained from the transmission line 80 and outputs the HDTV signal to the video converting and splitting unit 152 through a HD-SDI. The video converting and splitting unit 152 of the HDTV decoder 150 extracts and splits the SDTV signals of six channels which are multiplexed in the active video information region of the HDTV signal received from the decoding unit 151 and outputs the respective SDTV signals through the SD-SDIs 156-1 to 156-6.

Further, the HDTV decoder 150 outputs to the HD-SDI 158 the HD video signal recorded in the active video information region of the HDTV signal received from the HDTV camera 70 through the decoding unit 151.

The display device 60-1 outputs and displays the SDTV signal received through the SD-SDI 156-1 on the monitor. The SDTV display device 60-2 outputs and displays the SDTV signal received through the SD-SDI 156-2 on the monitor. The SDTV display device 60-3 outputs and displays the SDTV signal received through the SD-SDI 156-3 on the monitor. The SDTV display device 60-4 outputs and displays the SDTV signal received through the SD-SDI 156-4 on the monitor. The SDTV display device 60-5 outputs and displays the SDTV signal received through the SD-SDI 156-5 on the monitor. The SDTV display device 60-6 outputs and displays the SDTV signal received through the SD-SDI 156-6 on the monitor. The display device 60-7 outputs and displays the HDTV signal received through the HD-SDI 158 on the monitor.

The configuration of the video converting and combining unit 131 of the HDTV encoder 130 shown in FIG. 8 is the same as that of the video converting and combining unit 20 shown in FIG. 2, so that redundant description thereof will be omitted. The configuration of the video converting and splitting unit 152 of the HDTV decoder 150 shown in FIG. 8 is the same as that of the video converting and splitting unit 50 shown in FIG. 7, so that redundant description thereof will be omitted.

Figure 9:
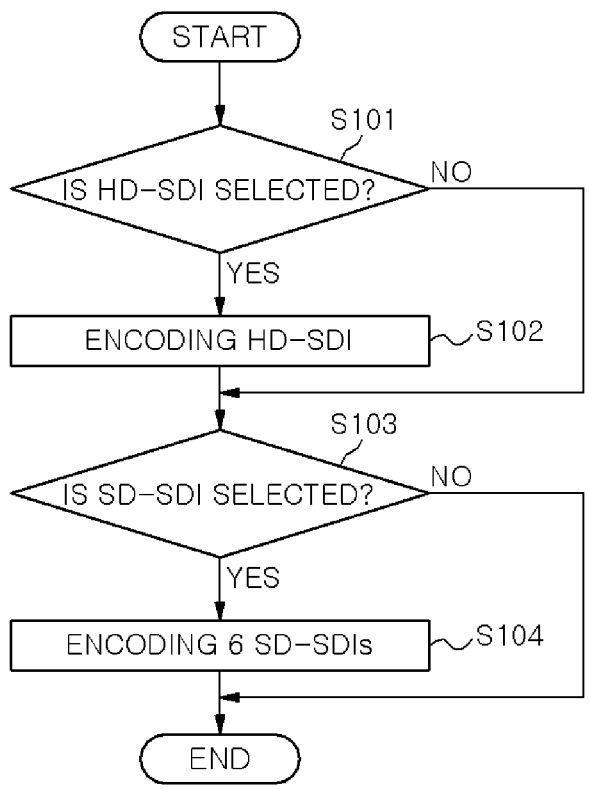
FIG. 9 is a flowchart showing an operation of an HDTV encoder 130.

Hereinafter, the operation of the HDTV encoder 130 of the video surveillance system according to the second embodiment will be described with reference to FIG. 9. FIG. 9 is a flowchart showing the operation of the HDTV encoder 130.

In the HDTV encoder 130, a video to be encoded is selected between videos from the six SD-SDIs and a video from the HD-SDI by a switch or by internal menu setting (step S101).

In the case of selecting the HD-SDI (YES in step S101), the HD video from the HD-SDI is encoded (step S102). In the case of "NO" in step S101, whether the six SD-SDIs are selected or not is determined (step S103). When the six SD-SDIs are selected (YES), the SD videos from the six SD-SDIs are combined into one HD video and the encoding is performed in the selecting/encoding unit 132. In the case of "NO" in step S103, the process is completed.

Figure 10:
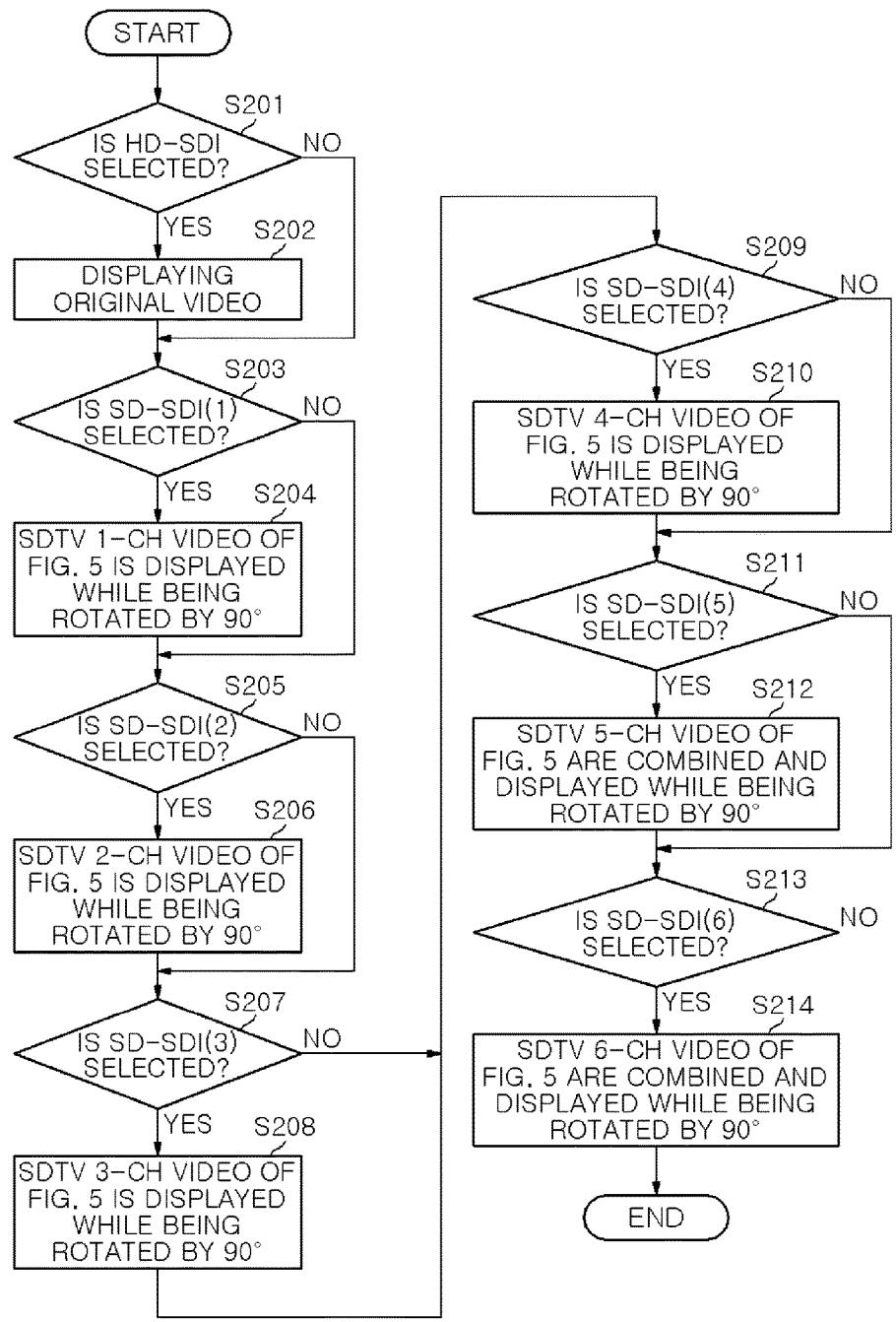
FIG. 10 is a flowchart showing a display control process in a display device 60.
Figure 11:
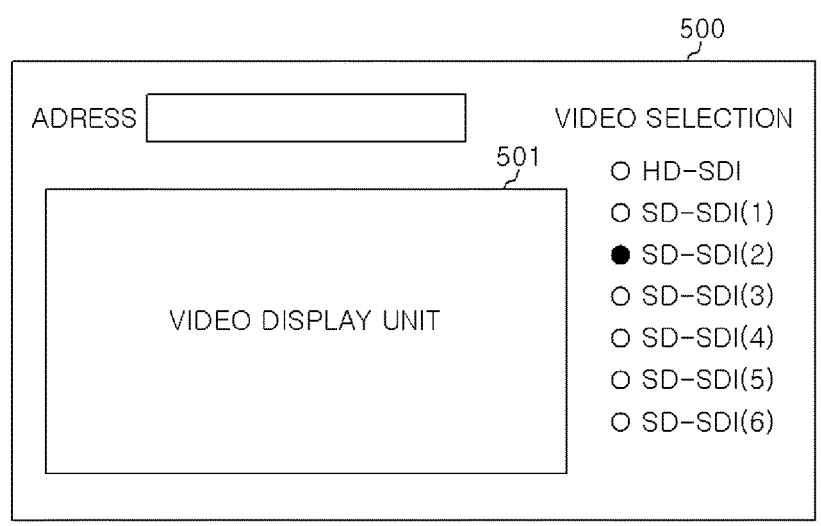
FIG. 11 shows an example of a display manipulation screen of the display device 60 which is manipulated by a client.

Next, a display control process in the case of playing a video transmitted in a multicast manner by the display device 60, in the HDTV encoder 130 of the video surveillance system according to the second embodiment, will be described with reference to FIG. 10. FIG. 10 is a flowchart showing the display control process in the display device 60. Further, FIG. 11 shows an example of a display manipulation screen of the display device 60 which is manipulated by a client. The client can select a desired video on a manipulation screen 500 shown in FIG. 11 which is displayed on the screen of the display device 60 of the client side.

When the client selects the HD-SDI by manipulating the manipulation screen 500 of the display device 60 (YES in step S201), the HD video from the HDTV camera 70 is displayed on the video display unit 501 of the manipulation screen 500 (step S202).

When the client does not select the HD-SDI in the step S201 (NO in step S201), the process proceeds to a step S203 to determine whether or not the SD-SDI (1) (1ch) is selected. In the case of "YES" in step S203, the first channel SD video of the SDTV which is shown in FIG. 5 is read out from a storage unit (not shown) and displayed on the video display unit 501 while being rotated by 90 degrees in a clockwise direction (original state) (step S204).

When the client does not select the SD-SDI (1) (1ch) in the step S203 (NO), the process proceeds to a step S205 to determine whether or not the SD-SDI (2) (2ch) is selected. In the case of "YES" in step S205, the second channel SD video of the SDTV which is shown in FIG. 5 is read out from the storage unit (not shown) and displayed on the video display unit 501 while being rotated by 90 degrees in the clockwise direction (original state) (step S206).

When the client does not select the SD-SDI (2) (2ch) in the step S205 (NO), the process proceeds to a step S207 to determine whether or not the SD-SDI (3) (3ch) is selected. in the case of "YES" in step 207, the third channel SD video of the SDTV which is shown in FIG. 5 is read out from the storage unit (not shown) and displayed on the video display unit 501 while being rotated by 90 degrees in the clockwise direction (original state) (step S208).

When the client does not select the SD-SDI (3) (3ch) in the step S207 (NO), the process proceeds to a step S209 to determine whether or not the SD-SDI (4) (4ch) is selected. In the case of "YES" in step 209, the fourth channel SD video of the SDTV which is shown in FIG. 5 is read out from the storage unit (not shown) and displayed on the video display unit 501 while being rotated by 90 degrees in the clockwise direction (step S210).

When the client does not select the SD-SDI (4) (4ch) in the step S209 (NO), the process proceeds to a step S211 to select whether or not the SD-SDI (5) (5ch) is selected. In the case of "YES" in step 211, the fifth channel SD videos of the SDTV which are shown in FIG. 5 are read out from the storage unit (not shown), combined, and displayed on the video display unit 501 while being rotated by 90 degrees in the clockwise direction (original state) (step S212).

When the client does not select SD-SDI (5) (5ch) in the step S211 (NO), the process proceeds to a step S213 to determine whether or not the SD-SDI (6) (6 ch) is selected. In the case of "YES" in step 213, the sixth channel SD videos of the SDTV which are shown in FIG. 5 are read out from the storage unit (not shown), combined, and displayed on the video display unit 501 while being rotated by 90 degrees in the clockwise direction (original state) (step S214).

As described above, in accordance with the video surveillance system of the second embodiment, the transmission of the video captured by the SD or the HD compliant camera can be realized by the inexpensive system configuration.

Third Embodiment

Hereinafter, a video surveillance system according to a third embodiment will be described.

In the video surveillance system according to the first embodiment, a plurality of SD videos is rotated, split and combined by the video converting and combining unit and transmitted as an HD video. On the other hand, in the video surveillance system according to the third embodiment, an HD video is split and rotated by the video splitting/rotating unit and transmitted as a plurality of SD videos.

(Configuration of Video Surveillance System)

Figure 12:
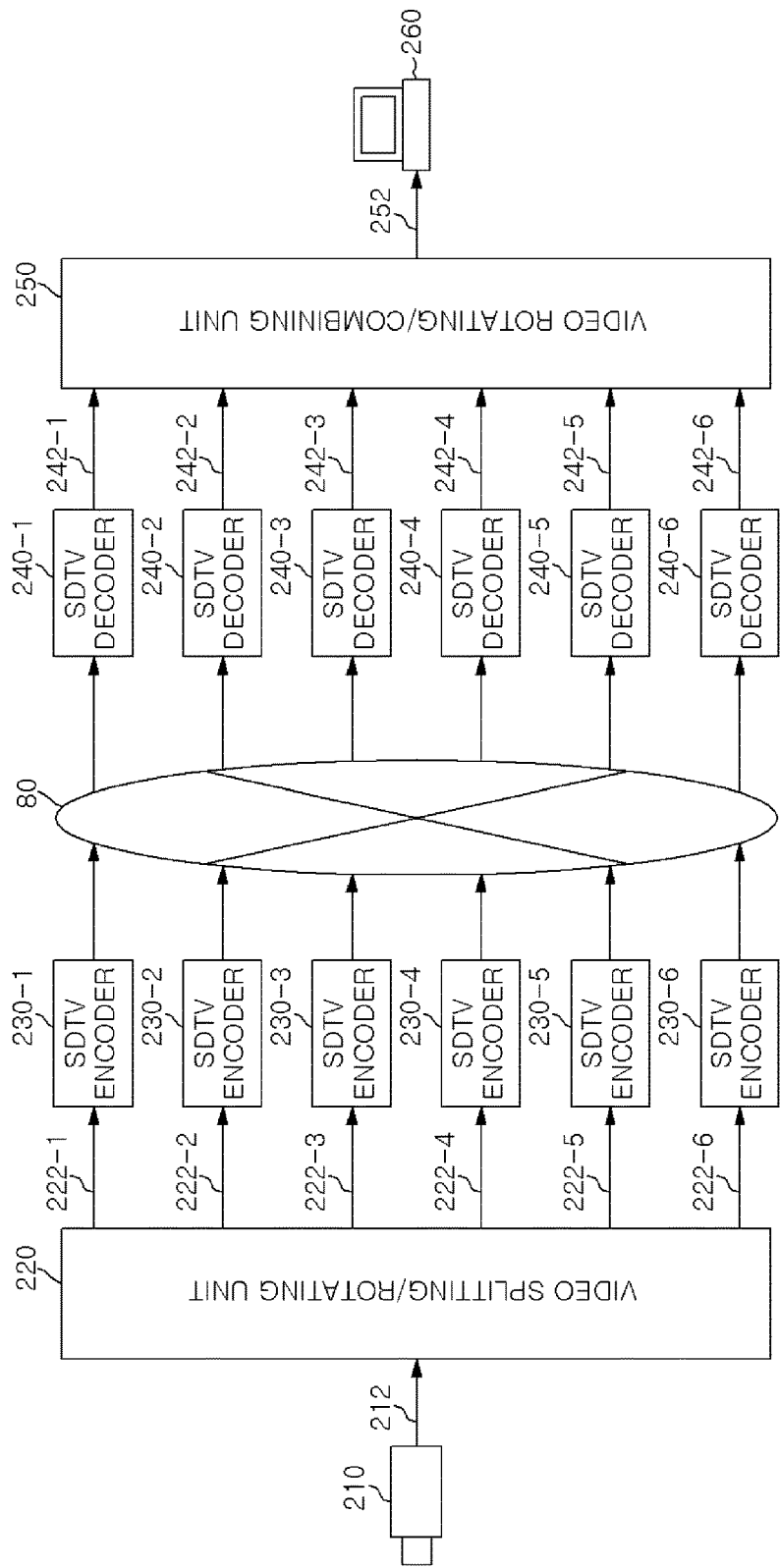
FIG. 12 is a block diagram showing an example of a configuration of a video surveillance system according to a third embodiment.

Hereinafter, the configuration of the video surveillance system according to the third embodiment will be described with reference to FIG. 12. FIG. 12 is a block diagram showing an example of the configuration of the video surveillance system according to the third embodiment.

In the video surveillance system according to the third embodiment, at the transmission side, the HDTV signal is split to six SDTV signals and the six SDTV signals are transmitted through six SD-SDIs. At the reception side, the HDTV signal is reproduced by combining the six SDTV signals into one HDTV signal.

The video surveillance system shown in FIG. 12 includes an HDTV camera 210, an HD-SDI 212, a video splitting/rotating unit 220, SD-SDIs 222-1 to 222-6, SDTV encoders 230-1 to 230-6, a transmission line 80, SDTV decoders 240-1 to 240-6, SD-SDIs 242-1 to 242-6, a video rotating/combining unit 250, an HD-SDI 252, and a display device 260.

Hereinafter, operations of the above components will be described.

The HDTV camera 210 outputs a captured video, i.e., a so-called HDTV signal, to the video splitting/rotating unit 220 through the HD-SDI 212.

The video splitting/rotating unit 220 extracts and separates the six SDTV signals assigned to the active video information region of the HDTV signal received through the HD-SDI 212 and outputs the SDTV signals to the respective SDTV encoders 230-1 to 230-6 through the SD-SDIs 222-1 to 222-6.

The SDTV encoders 230-1 to 230-6 perform image compression of the SDTV signals received through the SD-SDIs 222-1 to 222-6 and output the compressed information to the transmission line 80 such as the IP (Internet Protocol) network or the like.

The SDTV decoders 240-1 to 240-6 reproduce the SDTV signals by expanding the compressed information received from the transmission line 80 and outputs the SDTV signals to the video rotating/combining unit 250 through the SD-SDIs 242-1 to 242-6.

The video rotating/combining unit 250 multiplexes the SDTV signals received through the SD-SDIs 242-1 to 242-6 in the active video information region of the HDTV signal to be generated and outputs the HDTV signal to the display device 260 through the HD-SDI 252. The display device 260 outputs and displays on the monitor the HDTV signal received from the video rotating•combining unit 250 through the HD-SDI 252.

Since the configuration of the video splitting/rotating unit 220 is the same as that of the video converting and splitting unit 50 shown in FIG. 7, redundant description thereof will be omitted. Here, a specific operation performed in the video splitting/rotating unit 220 will be described.

In the video splitting/rotating unit 220, the HDTV signal inputted from the HDTV camera 210 through the HD-SDI 212 is split in the unit of video of the SDTV, rotated, combined and converted into SDTV signals.

Figure 13:
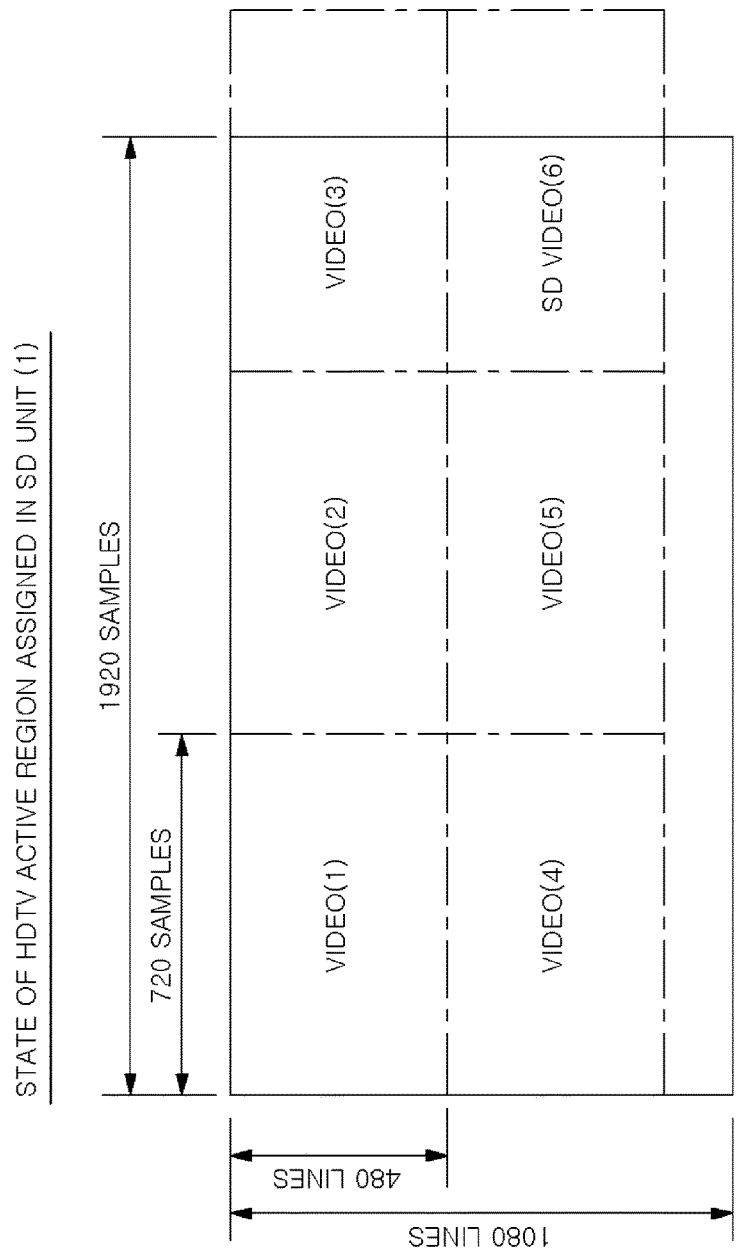
FIG. 13 schematically shows a first example in the case of assigning an active region of an HDTV in the unit of video of an SDTV.
Figure 14:
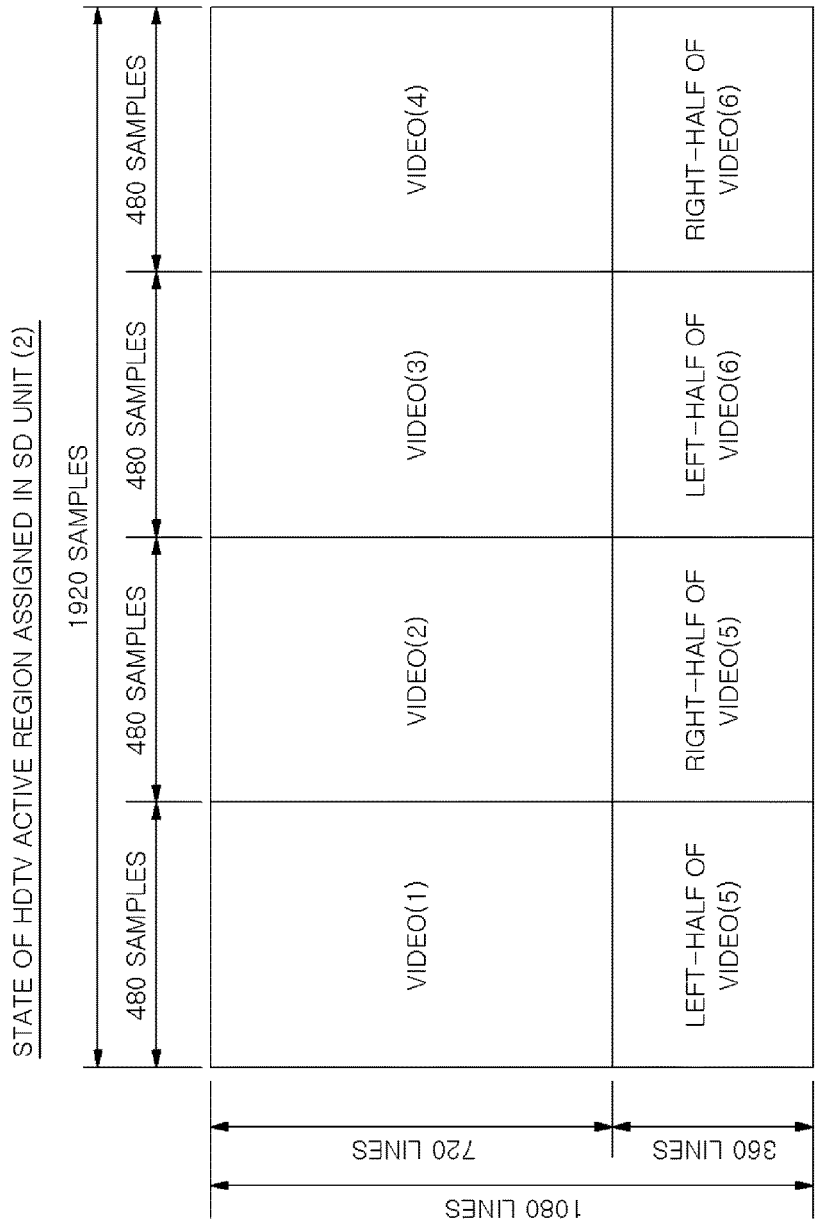
FIG. 14 schematically shows a second example in the case of assigning the active region of the HDTV in the unit of video of the SDTV.

FIG. 13 is a schematic diagram showing an example (1) in the case of assigning the active region of the HDTV in the video unit of the SDTV. FIG. 14 is a schematic diagram showing an example (2) in the case of assigning the active region of the HDTV in the unit of video of the SDTV.

As shown in FIG. 3, the display region (active region) of the HD video is 1920×1080 which is six times greater than 720×480 of the display region of the SD video. In the case of simply dividing the HD video into six SD video units, it is not possible to assign the display region of the HD video in the unit of the SD video at some locations, as can be seen from FIG. 13.

Therefore, in the video splitting/rotating unit 220, the HD video is divided into eight parts and rotated by 90 degrees in the clockwise direction as can be seen from FIG. 14. The SD videos (5) and (6), each being divided into the right half and the left half, are combined. Then, the six SD videos (1) to (6) are transmitted by the six SDTV encoders 230-1 to 230-6, respectively.

With this splitting process, a single HD video can be regarded as six SD videos and transmitted by using six SDTV encoders of the conventional equipment.

Since the configuration of the video rotating/combining unit 250 is the same as that of the video converting and combining unit 20 shown in FIG. 2, redundant description thereof will be omitted. Here, a specific operation performed in the video rotating/combining unit 250 will be described.

In the video rotating/combining unit 250, the SDTV signals inputted by the SD-SDIs 242-1 to 242-6 are multiplexed in the active video information region of the HDTV signal.

As shown in FIG. 14, the six SD videos (1) to (6) inputted through the SD-SDIs 242-1 to 242-6 are rotated by 90 degrees in the counterclockwise direction. The SD videos (1) to (4) are arranged in an upper part and the SD videos (5) and (6), each being divided into the right half and the left half at horizontal 360 pixels, are arranged as shown in FIG. 14. In this manner, the multiplexing process of the video signals is completed and the original HD video is restored.

With this combination, the divided six SD videos can be restored to one HD video and this HD video can be displayed on the display device 260.

The video splitting/rotating unit 220 may transmit, as the assignment information, the rotation information indicating that the rotation process is applied to each of the SD videos (1) to (6) and the division information indicating whether each of the divided SD videos (5) and (6) is the left half or the right half to the video rotating/combining unit 250.

Figure 15:
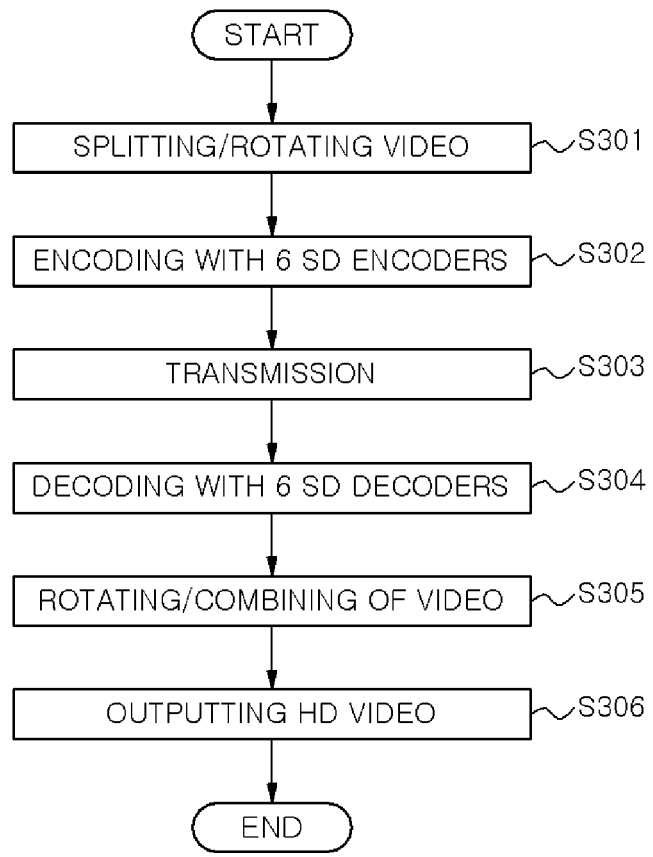
FIG. 15 is a flowchart showing an operation of the video surveillance system according to the third embodiment.

Next, the operation of the video surveillance system according to the third embodiment will be described with reference to FIG. 15. FIG. 15 is a flowchart showing the operation of the video surveillance system according to the third embodiment.

In a step S301, when the HDTV signal is received from the HDTV camera 210 through the HD-SDI 212, the video splitting/rotating unit 220 extracts and splits the six SDTV signals assigned to the active video information region of the inputted HDTV signal and outputs the SDTV signals to the six SDTV encoders 230-1 to 230-6.

In a step S302, the SDTV encoders 230-1 to 230-6 perform image compression on the received SDTV signals and transmit the image-compressed signals to the SDTV decoders 240-1 to 240-6 through the transmission line 80 (step S303).

In a step S304, the SDTV decoders 240-1 to 240-6 reproduce the SDTV signals by expanding the compressed information obtained through the transmission line 80 and output the reproduced SDTV signals to the video rotating/combining unit 250.

In a step S305, the video rotating/combining unit 250 multiplexes the inputted SDTV signals in an active video information region of an HDTV signal to be generated.

In a step S306, the video rotating/combining unit 250 displays the HD video on the monitor of the display device 260 by outputting the HDTV signal to the display device 260.

As described above, in accordance with the video surveillance system according to the third embodiment, the transmission of the video captured by the SD or the HD compliant camera can be realized by the inexpensive system configuration.

The configurations and the operations of the above embodiments are examples and may be appropriately modified without departing from the scope of the present invention.

INDUSTRIAL APPLICABILITY

The present invention is used in an industry for manufacturing a video surveillance system for displaying a video that has been captured by an image pickup device such as a surveillance camera or the like and transmitted through a transmission line such as an IP network or the like.

DESCRIPTION OF REFERENCE NUMERALS 10, 10-1 to 10-6: SDTV camera
12-1 to 12-6: SD-SDI 20: video converting and combining unit
22: HD-SDI
30: HDTV encoder
40: HDTV decoder
42: HD-SDI
50: video converting and splitting unit
52-1 to 52-6: SD-SDI
60, 60-1 to 60-6: display device
70: HDTV camera
72: HD-SDI
80: transmission line
130: HDTV encoder
131: video converting and combining unit
132: selecting/encoding unit
150: HDTV decoder
151: decoding unit
152: video converting and splitting unit
156-1 to 156-6: SD-SDI
158: HD-SDI
210: HDTV camera
212: HD-SDI
220: video splitting/rotating unit
222-1 to 222-6: SD-SDI
230-1 to 230-6: SDTV encoder
240-1 to 240-6: SDTV decoder
242-1 to 242-6: SD-SDI
250: video rotating/combining unit
252: HD-SDI
260: display device
500: manipulation screen
501: video display unit

What is claimed is:

1. A video surveillance system comprising:
a plurality of surveillance cameras;
a video converting and combining unit configured to combine a plurality of videos captured by the respective surveillance cameras into one combined video;
an encoder configured to encode the combined video combined by the video converting and combining unit;
a decoder configured to decode the combined video transmitted from the encoder through a transmission line;
a video converting and splitting unit configured to split the combined video decoded by the decoder into the videos captured by the respective surveillance cameras; and
a display device configured to display on a display screen the videos captured by the respective surveillance cameras inputted from the video converting and splitting unit,
wherein when combining the videos captured by the plurality of surveillance cameras into one combined video, the video converting and combining unit appends assignment information in which each of the surveillance cameras that captured the plurality of videos, rotation information indicating application of a rotation process, and division information indicating whether the corresponding video is a left half video or a right half video are associated with one another, and
wherein the video converting and splitting unit splits the combined video into a plurality of videos based on the assignment information.

2. The video surveillance system of claim 1, wherein the surveillance cameras are SD (Standard Definition) compliant cameras,
the video converting and combining unit combines five or six SD videos captured by the respective surveillance cameras into one HD (High Definition) video, and
the video converting and splitting unit splits the HD video decoded by the decoder into five or six SD videos.

3. A video surveillance method comprising the steps of: capturing SD videos by a plurality of surveillance cameras; combining the SD videos into one HD video by a video converting and combining unit; encoding the HD video by an encoder; decoding the HD video transmitted from the encoder through a transmission line by a decoder; splitting the HD video decoded by the decoder into the SD videos by a video converting and splitting unit; and displaying the SD videos inputted from the video converting and splitting unit on a display screen by a a display device, wherein the step of combining the SD videos into one HD video, comprising the step of: appending assignment information in which each of the surveillance cameras capturing the SD videos, rotation information indicating application of a rotation process and division information indicating whether the corresponding video is a left half video or a right half video are associated with one another, and wherein the step of splitting the HD video decoded by the decoder into the SD videos, comprising the step of: splitting the HD video decoded by the decoder into the SD videos based on the assignment information.

* * * * *